(12) United States Patent
Sano et al.

(10) Patent No.: US 7,901,639 B2
(45) Date of Patent: Mar. 8, 2011

(54) REACTION APPARATUS

(75) Inventors: Tadashi Sano, Ushiku (JP); Mio Suzuki, Hitachinaka (JP); Yukako Asano, Ushiku (JP); Shigenori Togashi, Abiko (JP); Tsutomu Kawamura, Mito (JP); Tomofumi Shiraishi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 452 days.

(21) Appl. No.: 11/829,147

(22) Filed: Jul. 27, 2007

(65) Prior Publication Data
US 2008/0175768 A1 Jul. 24, 2008

(30) Foreign Application Priority Data
Jul. 28, 2006 (JP) .................. 2006-205535

(51) Int. Cl.
*B01J 19/00* (2006.01)
*C07B 59/00* (2006.01)
(52) U.S. Cl. .................. 422/198; 422/129; 422/130
(58) Field of Classification Search .................. 422/129, 422/130, 198
See application file for complete search history.

(56) References Cited

U.S. PATENT DOCUMENTS

| | | | | |
|---|---|---|---|---|
| 3,812,169 | A | * | 5/1974 | Hammond et al. ........... 560/342 |
| 5,400,642 | A | * | 3/1995 | Salvador Palacios et al. . 73/23.2 |
| 2003/0036619 | A1* | | 2/2003 | Chrisman et al. .......... 526/348.2 |
| 2004/0018300 | A1* | | 1/2004 | Baillet et al. .................. 427/162 |
| 2004/0127762 | A1* | | 7/2004 | Dalloro et al. ................ 585/475 |

FOREIGN PATENT DOCUMENTS

| | | |
|---|---|---|
| DE | 102 97 192 | 8/2004 |
| JP | 2003-126673 | 5/2003 |
| JP | 2005-103484 | 4/2005 |
| JP | 2006-061903 | 3/2006 |
| WO | WO 2006/045886 | 5/2006 |

OTHER PUBLICATIONS

Translation of JP 2005-103484 - Oct. 2010.*
German Office Action 10 2007 035 269.5 dated Mar. 16, 2009.
Official Action issued in Japanese Patent Application No. 2006-205535 on Aug. 4, 2010.

* cited by examiner

*Primary Examiner* — Walter D Griffin
*Assistant Examiner* — Huy-Tram Nguyen
(74) *Attorney, Agent, or Firm* — Antonelli, Terry, Stout & Kraus, LLP.

(57) ABSTRACT

There is provided a reaction apparatus which is capable of keeping the pressure inside the reactor and is applicable to various fields. This reaction apparatus comprises: a raw material tank (2) for storing a raw material; a high-pressure pump (3) communicated with the raw material tank (2) and designed to deliver the raw material therefrom; a reactor (1) which is disposed on the downstream side of the high-pressure pump (3) and designed to be supplied with the raw material in a compressed state; a heating bath (11) for heating the reactor (1) to promote a reaction; and a product tank (7) for receiving and recovering a product; wherein the reaction apparatus is further equipped with an inlet port which is interposed between the heating bath (11) and the product tank (7), and with an injection pump (6) for injecting an injecting liquid through the inlet port, whereby a pressure of product flowing into the product tank (7) is enabled to be reduced by making use of the flow rate of the injecting liquid.

12 Claims, 3 Drawing Sheets

US 7,901,639 B2

REACTION APPARATUS

BACKGROUND OF THE INVENTION

The present invention relates to a reaction apparatus for a fluid, which is designed to be employed in the production of a chemical substance, in the synthesis of new material and in the discovery of a novel synthesizing method, and, in particular, to a reaction apparatus using a microreactor and suited for use under high-temperature/high-pressure conditions, especially even under the conditions for a supercritical fluid.

In an attempt to make it possible to apply the microreactor to a supercritical fluid and to a high-temperature/high-pressure process, there has been conventionally proposed, as shown in JP Published Patent Application No. 2006-061903 (A) for example, techniques wherein the microreactor is assembled as a module in such a manner that a plurality of high-pressure fine tubes are bundled each other and the opposite ends thereof are respectively joined into a single tube.

Further, in an attempt to provide a treatment system for the process utilizing a high-pressure fluid such as a supercritical fluid without necessitating any kind of compressor, there has been proposed, as shown in JP Published Patent Application No. 2003-126673(A) for example, techniques to utilize a pressure to be derived from thermal expansion.

According to any of the aforementioned prior techniques, it is imperative to increase the pressure of inflow side to a high pressure and to reduce the pressure by making use of a pressure-reducing valve after the fluid is cooled down on the inflow side. As a result, these prior techniques are accompanied with not only a problem that clogging may be caused to generate, giving damage to the reliability of techniques but also various problems that it is difficult to keep the pressure even if the flow rate of fluid is very low, to increase the reaction temperature and to make them maintenance-free. Due to these reasons, these conventional techniques are not sufficiently applicable to a wide range of high-temperatures and high-pressures.

BRIEF SUMMARY OF THE INVENTION

Therefore, an object of the present invention is to provide a reaction apparatus which is capable of overcoming the aforementioned problems of the conventional techniques and capable of maintaining the pressure inside a reactor at a constant pressure with high precision.

With a view to achieve the aforementioned object, the present invention provides a reaction apparatus which comprises: a raw material tank for storing a raw material; a high-pressure pump communicated with the raw material tank and designed to deliver the raw material from the raw material tank; a reactor which is disposed on the downstream side of the high-pressure pump and designed to be supplied with the raw material in a compressed state; a heating bath for heating the reactor to promote a reaction; and a product tank for receiving and recovering a product from the reactor; wherein the reaction apparatus is further equipped with an inlet port which is interposed between the heating bath and the product tank, and with an injection pump for injecting an injecting liquid through the inlet port, whereby a pressure of product flowing into the product tank is enabled to reduce by making use of the flow rate of the injecting liquid.

According to the present invention, since the pressure-reducing valve is no longer required to be employed, the internal pressure during the reaction can be precisely controlled irrespective of the flow rate. Therefore, according to the reaction apparatus of the present invention, it is possible, without giving damage to the reliability of reaction apparatus, to keep the pressure even if the flow rate is very low, to increase the reaction temperature and to make them maintenance-free, thus rendering the present invention applicable to a wide range of high-temperatures and high-pressures.

DETAILED DESCRIPTION OF THE INVENTION

In a chemical plant, a large number of Class 1 pressure vessels for handling a substance under the high-temperature/high-pressure conditions are employed, examples of such pressure vessels including a heating vessel, a reactor, an evaporator, accumulator, etc. The interior of this Class 1 pressure vessel is subject to enormous accumulation of energy, so that if an accident such as explosion or bursting is caused to occur, a great magnitude of casualties will be resulted. Because of this, this Class 1 pressure vessel is regulated by various kinds of rules and laws, resulting in increase of the cost for safety equipments.

In recent years, many attentions have been paid to a reaction apparatus called a microreactor which is constructed such that it comprises a structure with a fine channel having a width and a length both ranging from several micrometers to several hundreds micrometers, wherein two or more kinds of fluid reactants, which are reactive with each other, are designed to be introduced into the fine channel and allowed to contact with each other to bring about a chemical reaction. Since this microreactor is featured in that the surface area per unit volume is relatively large, that the width (height) of the channel is small, and that the volume of the channel is relatively small, it is expected possible to obtain various advantages that the mixing time can be shortened, that the heat exchange can be accelerated, and that the reaction would become higher in efficiency. Further, since the volume of the channel is small, a reaction under high-temperature/high-pressure conditions can be performed without being bound by the various regulations specified for the Class 1 pressure vessel. Therefore, it is now possible to apply the microreactor to a chemical reaction apparatus which is adapted to be used under the high-temperature/high-pressure conditions. For example, it is possible to widen the applicability of the microreactor to various chemical reactions wherein a supercritical fluid, a dissolved gas, a less-dissolvable substance or a substance which is low in reaction rate is employed for example.

Figure 1:
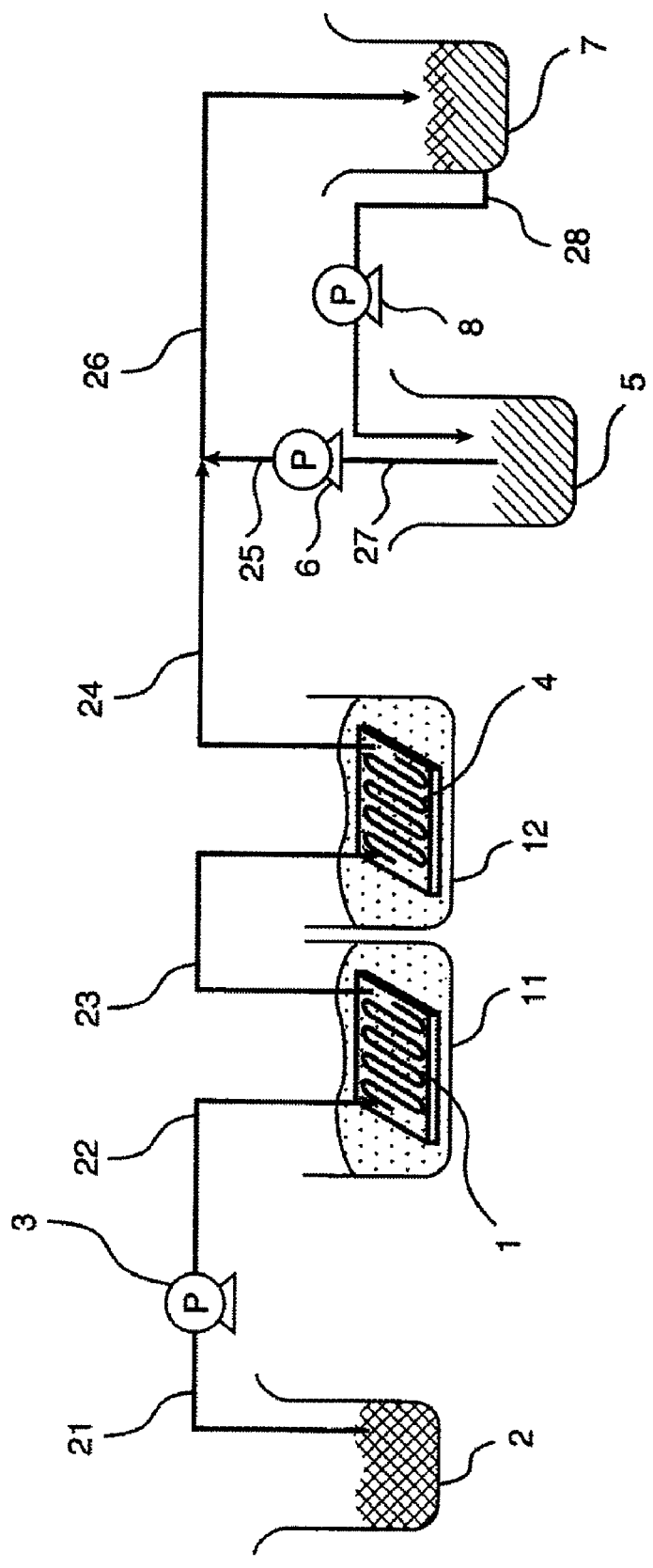
FIG. 1 is a flow chart illustrating one embodiment of the present invention.

FIG. 1 is a schematic diagram illustrating a reaction apparatus representing one embodiment of the present invention, wherein the reaction apparatus is constituted by a reactor 1, a raw material tank 2, a high-pressure pump 3, a condenser 4, an injecting liquid tank 5, an injection pump 6, a product tank 7, a returning pump 8, a heating bath 11, a cooling bath 12 and channels 21, 22, 23, 24, 25, 26, 27 and 28.

An injecting liquid is designed to be delivered, by means of the injection pump 6, from the injecting liquid tank 5 to the product tank 7 through the channels 27, 25 and 26. On this occasion, the pressure of the start point of the channel 26, i.e. the pressure of the confluent portion consisting of the terminals of the channels 24 and 25 is determined by the pressure loss of the liquid flowing through the channel 26.

Assuming that the cross-sectional configuration of channel 26 is circular and the representative size of this cross-sectional configuration is the same all along the entire length of the channel 26, when a fluid is permitted to flow through a fine channel, the flow would become a laminar flow in general. More specifically, when Reynolds number or a dimensionless number represented by the following equation is less than 2100, the flow would become a laminar flow.

$$Re = Du\rho/\mu \quad (1)$$

wherein Re is Reynolds number; D is an inner diameter (m) of the channel 26; u is a cross-sectional average flow rate (m/s) of fluid; $\rho$ is a density (kg/m$^3$) of fluid; and $\mu$ is a viscosity (Pa·s) of fluid.

In the case of laminar flow, when a fluid is permitted to flow through the channel of circular tube, a pressure loss represented by the following Hagen-Poiseuille equation would be caused to occur.

$$\Delta P = 32\mu Lu/D^2 \quad (2)$$

wherein $\Delta P$ is a pressure loss (Pa); and L is a length (m) of the channel 26. Assuming that the flow rate of fluid at the channel 26 is Q (m$^3$/s), the following equation would be established between a cross-sectional average flowing velocity u of fluid and the inner diameter D of the channel 26.

$$Q = \pi D^2 u/4 \quad (3)$$

Therefore, the equation (2) illustrating the pressure loss can be represented by the following equation. Namely, under the conditions where the flow rate is constant, the pressure loss varies as the length L of the circular tube and varies inversely as the fourth power of the inner diameter D of the circular tube.

$$\Delta P = 128\mu QL/D^4 \quad (4)$$

The pressure of the confluent portion is regulated such that the lower limit thereof is determined by the flow rate flowing through the channel 25, i.e. the flow rate of injecting liquid. As long as there is no counter-flow at the high-pressure pump 3, there is no possibility that the pressure at the channels 22, 23 and 24, the reactor 1 and the condenser 4 would become lower than the value to be determined by the aforementioned equation (4).

By means of the high-pressure pump 3, the raw material is fed from the raw material tank 2 via the channel 21 to the reactor 1. The product obtained through heating at the heating bath 11 and the reaction is delivered through the channel 23 to the condenser 4 and cooled by means of the cooling bath 12. Thereafter, the product is delivered to pass through the channel 24 and joined with a fluid from the channel 25 and then permitted to flow through the channel 26, thus enabling the product to be recovered at the product tank 7.

Assuming that the pressure inside the reactor 1 is approximately the same as the atmospheric pressure, if the temperature of the reactor 1 is set to the boiling point or more, the liquid delivered thereto is caused to boil, thus making it difficult to control the reaction conditions such as flow rate. However, since the inner pressure of a route from the channel 23 to the channel 24 including the reactor 1 that has been heated up to high temperatures is made higher exceeding the pressure loss of the channel 26 that can be determined by the aforementioned equation (4), it is possible to deliver a liquid raw material as it is as long as the conditions are satisfied. The relationship between the temperature and the pressure of the reactor for preventing the generation of boiling can be secured by setting the temperature so as to make all of the vapor pressure of the substances to be introduced into the reactor 1 become lower than the pressure to be determined by the aforementioned equation (4).

For example, when toluene is employed as a solvent to be delivered into the reactor and the reaction temperature is set to 150° C., the vapor pressure of toluene would become about 0.26 MPa. Therefore, in the case where the injecting liquid is water, the injecting liquid is delivered with the specification of the channel 26 being set to 500 (diameter)×1.5 m and the flowing velocity thereof being set to 1.4 m/s (flow rate: 275 µL/s), thus rendering the pressure loss to become 0.27 MPa, which is higher than the vapor pressure of toluene at a temperature of 150° C. As a result, toluene can be delivered without generating the boiling of toluene. By the way, since the boiling point of toluene at atmospheric pressure is about 111° C., it is possible to prevent the boiling of toluene by cooling the toluene down to not higher than 111° C. by making use of the condenser 4 or water employed as an injecting liquid and then by reducing the pressure thereof to atmospheric pressure.

Once the delivering of a raw material is initiated, the flow rate of the injecting liquid for generating pressure is reduced. Namely, since the pressure loss is caused to increase as the raw material flows into the channel 26, the flow rate of injecting liquid can be reduced by a magnitude of unnecessary pressure loss exceeding a target pressure. Therefore, by reducing the liquid-delivering quantity of the injection pump 6 while monitoring the liquid-delivering quantity of the high-pressure pump 3, the driving energy as well as the quantity of the injecting liquid to be used can be saved. Under certain circumstances, the supply of injecting liquid may be completely suspended.

Further, it is possible to omit the condenser 4 and the cooling bath 12, thereby allowing the liquid discharged from the reactor 1 to be naturally cooled down to the boiling temperature thereof during time when the liquid passes through the channel 23 or the channel 24 before the liquid reaches the confluent point. Further, the liquid discharged from the reactor 1 may be cooled down by making use of the injecting liquid. Namely, the temperature of the liquid at the confluent point may not necessarily be lower than the boiling point. It is only required that the pressure at a certain point in the channel is set and controlled so as to exceed the vapor pressure of the liquid at that point.

Since the injecting liquid can be repeatedly utilized, the product tank 7 can be connected with the injecting liquid tank 5 by making use of the channel 28, wherein the flow rate of the injecting liquid can be controlled by making use of a return pump 8 or by making use of the head (fall), a valve, etc.

The control of the injecting flow rate can be easily performed, if the product to be obtained consists of a single phase. However, if the product is formed of a two-phase stream consisting of liquid-liquid such as water and oil, or formed of a two-phase stream consisting of solid-liquid, the control of the injecting flow rate would become more difficult. Therefore, it is advisable that the liquid phase to be employed as the injecting liquid is limited to only one kind. For example, if the specific gravity of the injecting liquid desired to be employed is relatively heavy, the injecting liquid can be drawn from a lower portion of the product tank. On the other hand, if the specific gravity of the injecting liquid is relatively light, the injecting liquid can be drawn from an upper portion of the product tank. In this case, it is possible to omit the injecting liquid tank 5 and to install the starting point of the channel 27 at a region inside the product tank 7. Further, an oil separator may be mounted at an intermediate portion between the product tank 7 and the injecting liquid tank 5, thereby making it possible to take out a liquid phase as desired and to precisely control the injecting flow rate, i.e. the reduction of pressure even when the product is not formed of a single phase.

Further, it is also possible to perform new unit processing in the channel 26 and at a temperature lower than the boiling point of a substance. In this case, the processing can be performed accurately by additionally installing a new reactor in the route of channel 26. For example, a new reagent may be injected from the channel 25 into the substance produced in the reactor 1 to perform a chemical reaction in the channel 26. By formulating the reaction system such that the raw material and the injecting liquid are formed of an oily phase and an aqueous phase, respectively or, on the contrary, formed of an aqueous phase and an oily phase, respectively, it would become possible to perform extraction processing. More specifically, when a substance which is readily dissolvable in water is to be produced in a chemical reaction of an organic material, the injecting liquid should be selected from water and an aqueous solution, thereby making it possible to extract the product by making use of the aqueous phase in the channel 26.

Since the heating bath 11 and the cooling bath 12 are employed simply for the purpose of giving and receiving heat relative to the reactor 1 and the condenser 4, respectively, they may be constructed such that a heater or a cooler is wound respectively around the reactor 1 or the condenser 4 or such that a piping may be installed inside the reactor 1 and the condenser 4. It is more preferable, in order to accurately perform the temperature control, to utilize Peltier device.

In the employment of a high-pressure reaction apparatus, the starting operation and the stopping operation should be carefully performed. Namely, on the occasion of starting the reaction apparatus, the injection pump 6 is required to be started prior to the starting of the high-pressure pump 3. For example, under the conditions when the temperature of reactor 1 has already raised up to a predetermined temperature, if the delivery of raw material is started before the pressure of the confluent portion is increased, the raw material may be caused to boil inside a hot reactor 1, thereby increasing the possibilities that steam is caused to eject out of the channel 26. Therefore, since it is imperative that the injection pump is actuated to deliver an injecting liquid on the occasion when the reactor 1 is heated after the delivery of liquid by means of the high-pressure pump 3 or on the occasion when the delivery of liquid by means of the high-pressure pump 3 is started after the heating of the reactor 1, the high-pressure reaction apparatus should preferably be constructed such that it is provided with an interlock so that unless the aforementioned conditions are satisfied, it is impossible to operate the high-pressure reaction apparatus (in order to prevent the accidents that may be caused to occur due to erroneous operation or due to malfunctioning of machine, the interlock may be provided so as to make it impossible, when the operator of the reaction apparatus is doing erroneous operation or unless the procedures are not properly followed, to proceed to the next step).

On the occasion of stopping the operation of the reaction apparatus, if the operation of injection pump 6 is stopped prior to or concurrent with the suspension of the high-pressure pump 3, the interior of the reaction apparatus 1 is decreased in pressure, thereby permitting the raw material to boil in the hot reactor 1, thereby increasing the possibilities that steam is caused to eject out of the channel 26. Therefore, the injection pump is required to be continuously actuated until the temperature of the reactor 1 is decreased below the boiling point of raw material. Accordingly, in order to satisfy this requirement, the interlock should be regulated so as not to permit the injection pump to stop.

Further, in order to keep the pressure of starting time and stopping time of the reaction apparatus, a stopper valve having no constricted channel such as a ball valve which is free from any reduction of channel size may be installed in the channel 24 or in the channel 26, thereby suppressing the generation of clogging of channel.

On the occasion of changing the temperature of the reactor 1 to a target temperature, since it is not required, basically, to deliver a raw material thereto, it is only required to keep the pressure inside the reactor 1. This can be achieved by retaining the pressure between the stopper valve which is additionally installed and the high-pressure pump 3.

At the moments of power failure of emergency shutdown during the operation of the reaction apparatus, it is necessary to operate the reaction apparatus while suppressing the boiling of raw material. On the occasion of power failure, it is possible to overcome such an emergency by making use of a normally close-type stopper valve (generally, which can be brought into a closed state without power source). In the case where the injection of liquid is performed by means of pump, it can be overcome by making use of an uninterruptive power source. Likewise, in the case of emergency shutdown, the stopper valve should be closed and all of power sources should be cut off or, alternatively, only the injection pump may be kept actuated and the power sources of other instruments should be cut off.

Figure 2:
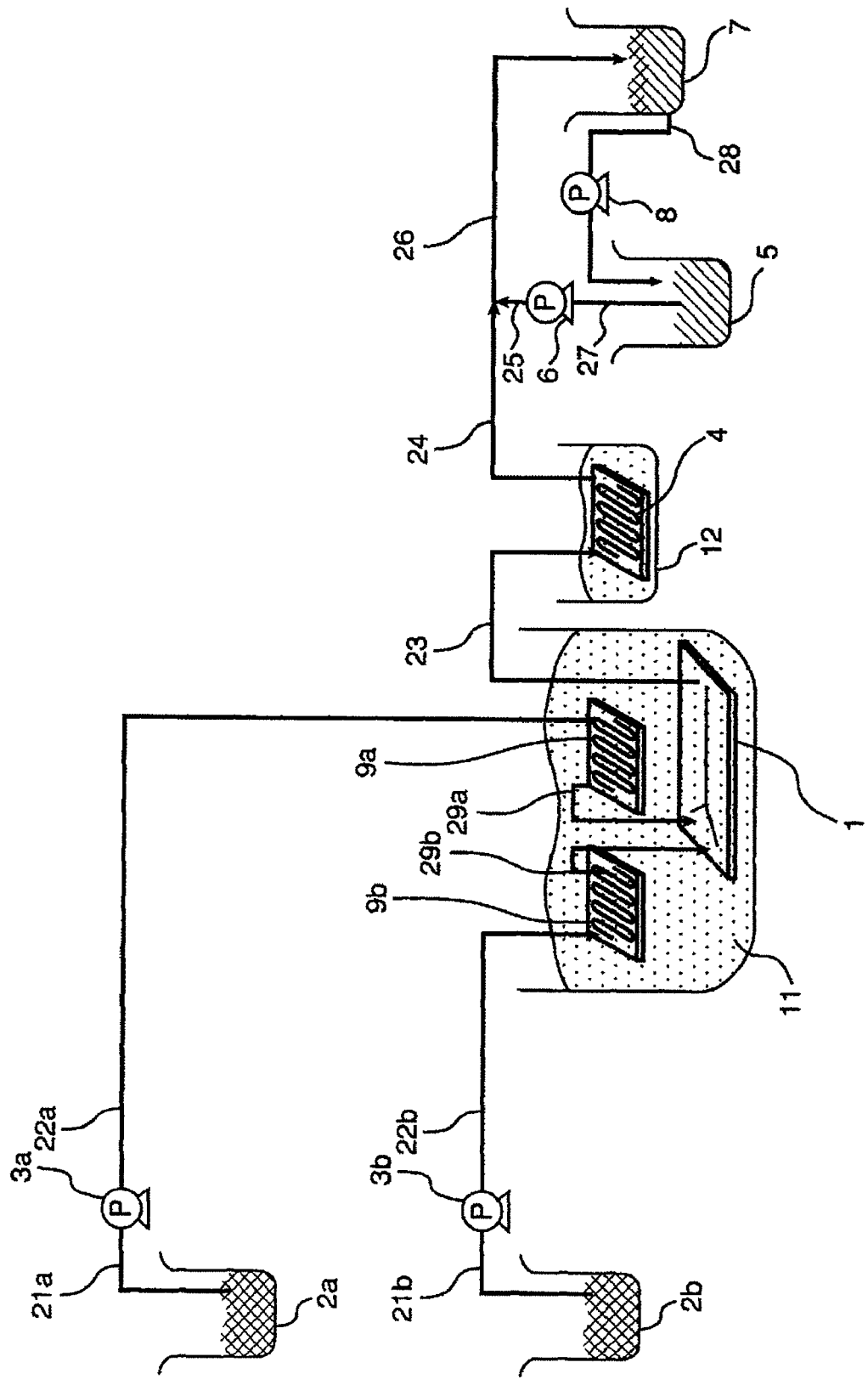
FIG. 2 is a flow chart illustrating another embodiment of the present invention.

FIG. 2 shows another embodiment of the present invention. Namely, the high-pressure reaction apparatus shown in FIG. 2 differs from the high-pressure reaction apparatus shown in FIG. 1 with regard to the chemical reaction to be handled therein. Namely, in the apparatus shown in FIG. 1, only one kind of substance is permitted to exist in the raw material tank or even if a plurality of substances are permitted to exist therein, the raw material to be employed in the apparatus shown in FIG. 1 is limited to those which cannot be reacted with each other unless they are heated. Whereas, in the case of the apparatus shown in FIG. 2, the raw material to be treated therein consists of two or more kinds of liquid which are enabled to initiate the reaction as they are simply contacted with each other. In the case of this reaction system, since the kinds and ratio of substances to be produced differ depending on the temperature to be employed, they are mixed together after they are heated up to a prescribed temperature.

The high-pressure reaction apparatus shown in FIG. 2 is constituted by a reactor 1, raw material tanks 2a and 2b, high-pressure pumps 3a and 3b, pre-heaters 9a and 9b, a heating bath 11, channels 21a, 21b, 22a, 22b, 29a and 29b, and other devices which are the substantially the same as those of the high-pressure reaction apparatus shown in FIG. 1. The raw materials to be subjected a chemical reaction are delivered, by means of the high-pressure pumps 3a and 3b, from the raw material tanks 2a and 2b, via the channels 21a, 21b, 22a and 22b, to the pre-heaters 9a and 9b, respectively. Then, these raw materials are respectively heated up to a predetermined temperature in the pre-heaters 9a and 9b and then fed, through the channels 29a and 29b, to the reactor 1 and mixed together to initiate the chemical reaction. The construction and functions of devices in the high-pressure reaction apparatus to be employed for treating the products discharged from the reactor 1 are the same as those of FIG. 1. Further, even when three or more kinds of raw materials are to be employed herein, it is simply required to increase the number of devices to be employed in the route starting from the raw material tank to the pre-heater in conformity with the increase in kind of raw materials, this increased number of devices being also arranged parallel with each others.

Figure 3:
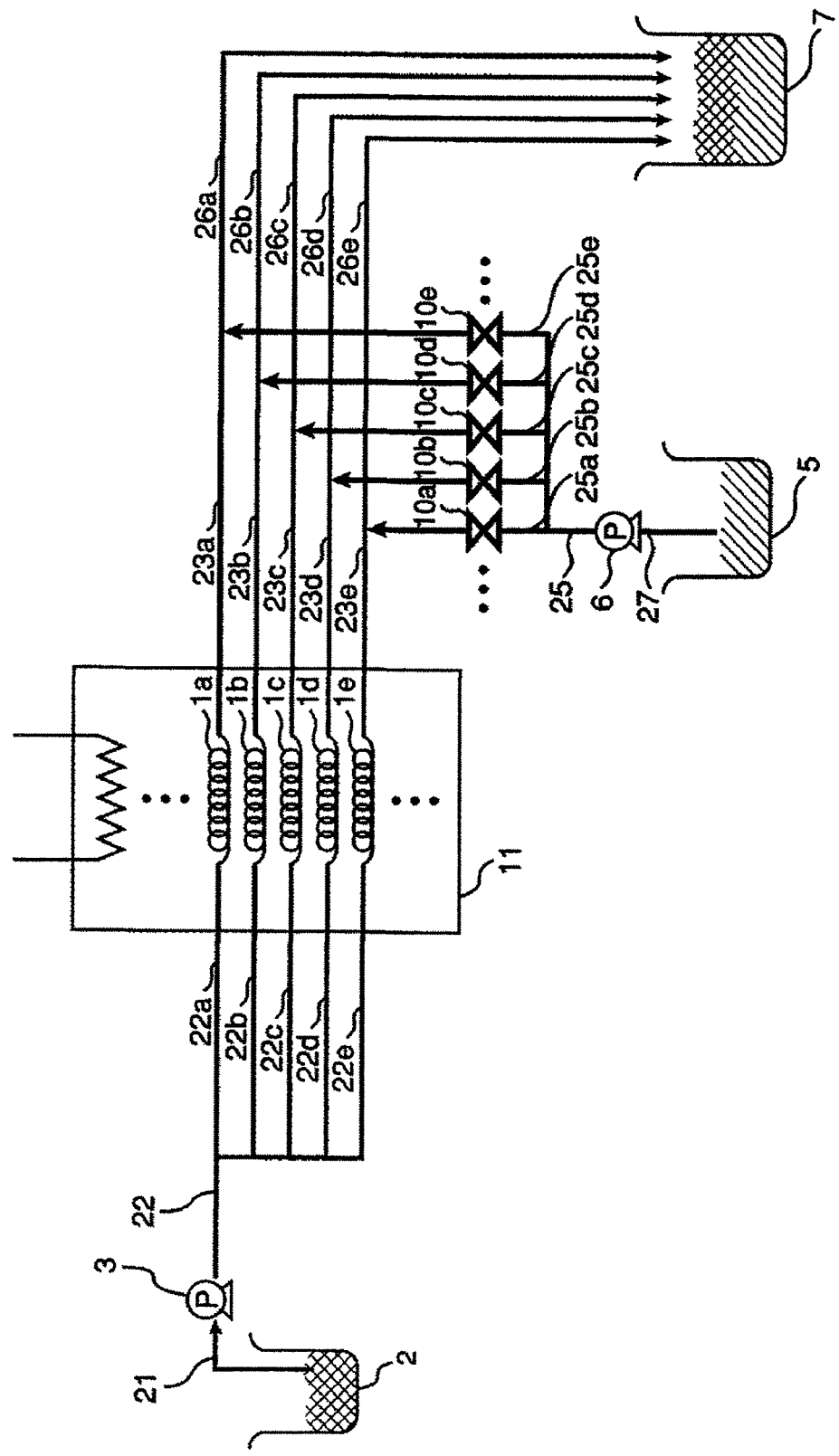
FIG. 3 is a flow chart illustrating a further embodiment of the present invention.

FIG. 3 shows a further embodiment of the present invention. this high-pressure reaction apparatus shown in FIG. 3 differs from that shown in FIG. 1 with respect to the construction of devices located on the downstream side of the channel 22. In the case of the reactor called microreactor which has a fine channel, when it is desired to increase the throughput, it is achieved by the tandem arrangement of the equivalent devices instead of executing the scale-up of the reactor, i.e. by increasing the size of reactor. In this case, when a high-pressure pump 3 is installed for each of the reactors, the control of the reaction conditions can be facilitated. This leads however to an increase in number of parts, resulting in a reaction apparatus of large size, thus increasing the manufacturing cost of the apparatus. Therefore, in order to reduce the manufacturing cost of the apparatus and to enhance the reliability of the apparatus, the number of the high-pressure pump is limited to only one and the channel is diverged after the pressure of raw material is increased by the pump, thereby allowing the raw material to flow into each of the reactors.

In the embodiment shown in FIG. 3, it is assumed to employ five reactors 1. the raw material is delivered, by means of the high-pressure pump 3, from the raw material tank 2 via the channel 21 to the channel 22 which is ultimately diverged into channels 22a, 22b, 22c, 22d and 22e, through which the raw material is transported into each of the reactors 1. The raw material is then heated in the heating bath 11 and reacted to create a product. The product thus obtained in each of the channels is permitted pass through each of the channels 23 and then joined with an injecting liquid from each of the channels 25, the resultant joined liquid being subsequently recovered, via the channel 26, in the product tank 7.

The injecting liquid is delivered from the injecting liquid tank 5 into the channel 27. Subsequently, by means of the injection pump 6, the injecting liquid is delivered to pass through the channel 25 which is ultimately diverged into channels 25a, 25b, 25c, 25d and 25e which are respectively joined with the terminals of channels 23. Therefore, due to the pressure loss to be generated as the joined liquid passes through the channels 26, it is possible to keep the pressure of each of the reactors 1.

In the case where the channels 25a, 25b, 25c, 25d and 25e thus diverged are respectively sufficiently thick relative to the channel 26, the pressure of the confluent portion would become constant. Therefore, the flow rate in each of the reactors 1 is determined by the pressure loss in the route between the diverged point of the channel 22 and the confluent points.

The parts are respectively accompanied with a difference in dimension due to the manufacturing error. Because of this difference, a difference in pressure loss is caused to generate, resulting in the generation of differences in flow rate among the reactors. However, due to the provision of flow rate-adjusting valves 10a, 10b, 10c, 10d and 10e in the channels 25, the flow rate of the injecting liquid passing through each of the channels 25 can be variably adjusted. Therefore, since the flow rate of injecting liquid flowing into each of the confluent portions can be adjusted in this manner, the difference in flow rate that may be caused to generate among the reactors can be minimized.

Since the flow rate-adjusting valve is constructed to have a channel structure which is made narrower than the channels to be connected with the fore and rear ends of the flow rate-adjusting valve, the probability of generating the clogging at this flow rate-adjusting valve may be increased. However, since the flow rate of the injecting liquid can be adjusted as described above, it is possible to adjust the flow rate in the channel where the product is permitted to pass through, thereby making it possible to minimize the probability of generating the clogging at this flow rate-adjusting valve.

If the injecting liquid is desired to be derived through the recycling of product, the injection of the injecting liquid can be conducted after finishing the filtering process thereof. Further, when the product is formed of two phases, i.e. an aqueous phase and an oily phase, it is preferable to select the phase which is smaller in quantity of impurities.

Although a condenser is not shown in FIG. 3, if the condenser is installed as shown in FIG. 1, it is possible to stabilize the reaction in each of the microreactors. In the case where it is impossible to mix the raw material in advance, a series of devices starting from the raw material tank 2 to the preheater 9 may be juxtaposed as shown in FIG. 2.

As described above, the reaction apparatus of the present invention is formed of a continuous liquid-delivering type chemical reaction apparatus, the internal pressure at the time of reaction can be accurately controlled irrespective of the flow rate to be employed. Further, it is possible to set the internal pressure higher than the vapor pressure of injecting liquid and to set the reaction temperature higher than the boiling point of the injecting liquid.

As a result, it is possible to increase the solubility of solid, to enhance the productivity, and to remarkably promote the chemical reaction of reactants which are low in reaction velocity. Further, since the quantity of dissolved gas can be increased by increasing the pressure, it is possible to enhance the efficiency of even the reaction employing a dissolved gas.

Moreover, on account of the synergistic effects to be derived from the conditions of high-temperature/high-pressure and the conditions to reduce the mixing time as well as due to the utilization of supercritical fluid, the possibility of bringing about novel chemical reactions would be increased. Because of these reasons, the present invention would contribute to the synthesis of novel substances and to the discovery of novel synthesizing methods.

The invention claimed is:

1. A reaction apparatus comprising:
   a raw material tank for storing a raw material;
   a high-pressure pump communicated with the raw material tank and designed to deliver the raw material from the raw material tank;
   a reactor which is disposed on the downstream side of the high-pressure pump and designed to be supplied with the raw material in a compressed state;
   a heating bath for heating the reactor to promote a reaction; and
   a product tank for receiving and recovering a product;
   wherein the reaction apparatus is further equipped with:
   an inlet port which is interposed between the reactor and the product tank; and
   an injection pump for injecting an injecting liquid through the inlet port;
   whereby a pressure of product flowing into the product tank is enabled to reduce by making use of the flow rate of the injecting liquid.

2. The reaction apparatus according to claim 1, wherein a pressure in a route between the high-pressure pump and the inlet port is made higher than a saturated vapor pressure of the substance existing in the channel, and the pressure of product flowing into the product tank is set to atmospheric pressure.

3. The reaction apparatus according to claim 1, wherein the product reacted through heating in the heating bath is cooled at an intermediate portion between the heating bath and the product tank.

4. The reaction apparatus according to claim 1, which further comprises an injecting liquid tank for storing the injecting liquid, the injecting liquid tank being communicated with the product tank, thereby enabling the injecting liquid to be delivered from the product tank to the injecting liquid tank.

5. The reaction apparatus according to claim 1, which further comprises an injecting liquid tank for storing the injecting liquid, the injecting liquid tank being communicated, via an oil separator, with the product tank, thereby enabling the injecting liquid to be delivered from the product tank to the injecting liquid tank.

6. The reaction apparatus according to claim 1, wherein the injection pump is designed to be actuated prior to the actuation of the high-pressure pump.

7. The reaction apparatus according to claim 1, wherein the raw material tank is formed of a plurality of tanks and the high-pressure pump is formed of a plurality of tanks, thereby enabling the raw material to flow through this plurality of tanks and then joined together before the raw material is permitted to enter into the reactor.

8. The reaction apparatus according to claim 1, wherein the raw material tank is formed of a plurality of tanks and the high-pressure pump is formed of a plurality of tanks, thereby enabling the raw material to flow through said plurality of tanks and then pass through a preheater before the raw material is permitted to enter into the reactor.

9. The reaction apparatus according to claim 1, wherein the reactor is constituted by a plurality of microreactors each having the inlet port on the downstream side thereof.

10. The reaction apparatus according to claim 1, wherein the reactor is constituted by a plurality of reactors each having the inlet port on the downstream side thereof and the flow rate of the injecting liquid is made variable in a passageway between the injection pump and the inlet port.

11. A reaction apparatus comprising:
a raw material tank for storing a raw material;
a high-pressure pump communicated with the raw material tank and designed to deliver the raw material from the raw material tank;
a reactor which is disposed on the downstream side of the high-pressure pump and designed to be supplied with the raw material in a compressed state;
a heating bath for heating the reactor to promote a reaction; and
a product tank for receiving and recovering a product;
wherein the reaction apparatus is further equipped with:
an inlet port which is interposed between the reactor and the product tank; and
an injection pump for injecting an injecting liquid through the inlet port;
whereby a pressure of product flowing into the product tank is enabled to reduce by making use of the flow rate of the injecting liquid,
wherein only a channel is interposed between the reactor and the inlet port.

12. A reaction apparatus comprising:
a raw material tank for storing a raw material;
a high-pressure pump communicated with the raw material tank and designed to deliver the raw material from the raw material tank;
a reactor which is disposed on the downstream side of the high-pressure pump and designed to be supplied with the raw material in a compressed state;
a heating bath for heating the reactor to promote a reaction; and
a product tank for receiving and recovering a product;
wherein the reaction apparatus is further equipped with:
an inlet port which is interposed between the reactor and the product tank; and
an injection pump for injecting an injecting liquid through the inlet port;
a condenser for cooling and condensing the product provided at an intermediate portion between the reactor and the product tank,
whereby a pressure of product flowing into the product tank is enabled to reduce by making use of the flow rate of the injecting liquid,
wherein only a channel is interposed between the condenser and the inlet port.

* * * * *